(12) United States Patent
Pudell

(10) Patent No.: US 12,473,041 B2
(45) Date of Patent: Nov. 18, 2025

(54) AIR GUIDANCE DEVICE FOR A MOTOR CAR, PARTICULARLY FOR A PASSENGER CAR, AND MOTOR CAR

(71) Applicant: Mercedes-Benz Group AG, Stuttgart (DE)

(72) Inventor: Etienne Pudell, Boeblingen (DE)

(73) Assignee: Mercedes-Benz Group AG, Stuttgart (DE)

( * ) Notice: Subject to any disclaimer, the term of this patent is extended or adjusted under 35 U.S.C. 154(b) by 378 days.

(21) Appl. No.: 18/245,051

(22) PCT Filed: Aug. 2, 2021

(86) PCT No.: PCT/EP2021/071516
§ 371 (c)(1),
(2) Date: Mar. 13, 2023

(87) PCT Pub. No.: WO2022/053224
PCT Pub. Date: Mar. 17, 2022

(65) Prior Publication Data
US 2023/0356790 A1  Nov. 9, 2023

(30) Foreign Application Priority Data

Sep. 14, 2020  (DE) .................... 10 2020 005 602.4

(51) Int. Cl.
*B62D 35/02* (2006.01)
*B60T 5/00* (2006.01)
*B62D 35/00* (2006.01)

(52) U.S. Cl.
CPC ................ *B62D 35/02* (2013.01); *B60T 5/00* (2013.01); *B62D 35/005* (2013.01)

(58) Field of Classification Search
CPC ...... B62D 35/00; B62D 35/008; B62D 35/02; B62D 25/16; B60B 7/00; B60B 7/0066;
(Continued)

(56) References Cited

U.S. PATENT DOCUMENTS 8,979,102 B1\* 3/2015 Prentice ............... B62D 25/186
280/124.1
9,327,778 B2  5/2016 Wolf
(Continued)

FOREIGN PATENT DOCUMENTS

DE        39 21 736 A1    1/1991
DE  10 2013 108 762 A1    2/2015
(Continued)

OTHER PUBLICATIONS

PCT/EP2021/071516, International Search Report dated Oct. 14, 2021 (Two (2) pages).
(Continued)

*Primary Examiner* — Gregory A Blankenship
(74) *Attorney, Agent, or Firm* — Crowell & Moring LLP

(57) ABSTRACT

An air guidance device of a motor car, where the motor car has a wheel rotatable around an axis of wheel rotation and the wheel has a wheel rim with an internal diameter, includes an air guidance element assigned to the wheel that has an air guidance surface. Air flowing over the air guidance surface during a journey of the motor car is guidable by the air guidance surface. The air guidance surface extends in a plane running perpendicularly to the axis of wheel rotation, directly borders an inner flank of the wheel rim inwards in a transverse direction of the motor car and/or upwards in a vertical direction of the motor car in a lower region in the vertical direction of the motor car, and extends over less than half of the internal diameter in the vertical direction of the motor car.

12 Claims, 2 Drawing Sheets

(58) Field of Classification Search
CPC .. B60B 7/008; B60B 7/04; B60B 7/02; B60T 5/00
USPC .......................................... 280/152.05, 152.2
See application file for complete search history.

(56) References Cited

U.S. PATENT DOCUMENTS

| | | | |
|---|---|---|---|
| 9,545,955 B2* | 1/2017 | Xu | B62D 25/186 |
| 11,453,444 B2* | 9/2022 | Bowen | B62D 65/16 |
| 2011/0080019 A1* | 4/2011 | Castillo | B62D 25/16 |
| | | | 296/180.1 |
| 2012/0091753 A1* | 4/2012 | Marlier | B62D 35/008 |
| | | | 296/180.1 |
| 2014/0265431 A1* | 9/2014 | Magee | B63H 9/04 |
| | | | 301/104 |
| 2016/0280289 A1* | 9/2016 | Watanabe | B62D 35/02 |
| 2020/0062029 A1* | 2/2020 | Wong | B60B 7/066 |
| 2020/0094884 A1* | 3/2020 | Driant | B62K 5/01 |
| 2020/0114681 A1* | 4/2020 | Parry-Williams | B60B 7/066 |
| 2020/0114982 A1* | 4/2020 | Parry-Williams | B62D 25/16 |
| 2020/0283072 A1* | 9/2020 | Ballarin | B60B 7/00 |
| 2021/0283946 A1* | 9/2021 | Van Beurden | B60B 7/02 |
| 2022/0177043 A1* | 6/2022 | Bowen | B62D 25/163 |
| 2022/0227166 A1* | 7/2022 | Tortu | B60B 7/061 |
| 2023/0007846 A1* | 1/2023 | Moradnia | B62D 35/00 |
| 2023/0013812 A1* | 1/2023 | Moradnia | B60T 5/00 |
| 2023/0109675 A1* | 4/2023 | Chevar | B62D 35/001 |
| | | | 296/180.1 |
| 2023/0312028 A1* | 10/2023 | Moradnia | B60G 3/00 |
| | | | 296/180.1 |
| 2023/0356790 A1* | 11/2023 | Pudell | B62D 35/02 |
| 2024/0149957 A1* | 5/2024 | Jansen | B62D 25/18 |
| 2024/0239135 A1* | 7/2024 | Walden | B60B 7/20 |
| 2025/0196531 A1* | 6/2025 | Kim | B60B 7/20 |
| 2025/0229571 A1* | 7/2025 | Harmon | B60B 7/04 |

FOREIGN PATENT DOCUMENTS

| | | |
|---|---|---|
| DE | 10 2017 221 009 A1 | 5/2019 |
| EP | 3 103 652 A1 | 12/2016 |
| WO | WO 2017/089574 A1 | 6/2017 |
| WO | WO 2017/103359 A1 | 6/2017 |

OTHER PUBLICATIONS

German-language German Office Action issued in German application No. 10 2020 005 602.4 dated May 6, 2021 (Five (5) pages).

* cited by examiner

AIR GUIDANCE DEVICE FOR A MOTOR CAR, PARTICULARLY FOR A PASSENGER CAR, AND MOTOR CAR

BACKGROUND AND SUMMARY OF THE INVENTION

The invention relates to an air guidance device for a motor car. The invention further relates to a motor car having at least one such air guidance device.

A motor vehicle having a wheel arch and a cover arranged in the region of the wheel arch protruding into the wheel arch for reducing the flow of air into the wheel arch when the motor vehicle is driving arises from DE 10 2013 108 762 A1. The cover is connected to an undercarriage cladding of the motor vehicle pivotably around a longitudinal axis of the motor vehicle on the side of the undercarriage cladding facing the wheel arch.

The object of the present invention is to create an air guidance device for a motor car and a motor car having such an air guidance device, such that particularly advantageous aerodynamics of the vehicle can be obtained.

A first aspect of the invention relates to an air guidance device for a motor car, in particular for a passenger car. The air guidance device comprises at least one air guidance element assigned to a wheel that can be rotated around an axis of wheel rotation, in particular relative to a structure of the motor car. The wheel comprises a wheel rim having an internal diameter. A tire of the wheel is raised on the wheel rim, for example. The wheel is a ground contact element, via which the motor vehicle also described as a motor car can be or is supported downwards in the vertical direction of the vehicle on a ground. Here the wheel, in particular the tire touches the ground directly. The previously specified structure of the motor car forms or delimits an interior of the motor car also described as a passenger space, in whose interior people, e.g., the driver of the motor car, can be located. The structure is a self-supporting body, for example. If the motor car is driven along the ground while the motor car is supported downwards in the vertical direction of the vehicle on the ground via the wheel, then the wheel rotates around the axis of wheel rotation relative to the structure, and the wheel rolls off on the ground.

The air guidance element has an air guidance surface, by means of which air that flows over the air guidance surface during a journey, in particular a forward journey of the motor car, may be or is guided.

In order to be able to obtain particularly advantageous aerodynamics of the motor car, i.e., to be able to keep the air resistance of the motor car particularly low such that the motor car can be driven in a particularly energy-efficient manner, it is provided according to the invention that the air guidance surface extends in a plane running perpendicular to the axis of wheel rotation. If the axis of wheel rotation runs in the transverse direction of the vehicle or in parallel to the transverse direction of the vehicle, for example, then the plane is stretched through the longitudinal direction of the vehicle (x direction) and the vertical direction of the vehicle (z direction), such that the plane is also described as an x-z plane. It is conceivable that the wheel is an unguided wheel that cannot be guided. It is further conceivable that the wheel is a guided wheel that can be pivoted or guided to cause the motor vehicle to carry out a lane change or change direction, for example. The air guidance element or air guidance surface can preferably be guided with the wheel when the wheel is a guidable wheel. It is thus preferably provided that the air guidance surface consistently extends in the or a plane running perpendicular to the axis of wheel rotation. Particularly when the wheel is a non-guidable wheel or when the wheel designed for example as a guidable wheel is configured for a journey of the motor car straight ahead and thus is not covered, the plane coincides with the x-z plane or the plane runs in parallel to the x-z plane. It is further provided according to the invention that the air guidance surface directly borders an inner or the inner flank of the wheel rim inwards in the transverse direction of the vehicle and/or upwards in the vertical direction of the vehicle in a lower region in the vertical direction of the vehicle. What should in particular be understood here is that no other, further component is arranged between the air guidance surface or the air guidance element and the flank. It is additionally preferably provided that the air guidance surface or the air guidance region does not touch the flank, and is thus spaced apart from the flank, in particular in such a way that a slight air gap, for example of a few millimetres, is arranged between the air guidance surface or the air guidance element and the flank. The air gap is directly delimited by the flank on one side and directly by the air guidance element on the other side, for example, and is preferably at most ten millimetres, in particular at most five millimetres wide. In other words, it is provided that the air guidance surface is arranged directly bordering the wheel rim or the flank in the y direction and/or in the z direction in the lower region of the wheel rim.

The spacing of the air guidance element from the wheel rim in such a way that the air gap is arranged between the air guidance surface and the flank is advantageous for preventing the air guidance element from rubbing against the wheel rim if the wheel rim rotates around the axis of rotation relative to the air guidance element during a journey. It is possible, however, that the air guidance surface or the air guidance element is mounted on the wheel rim, in particular such that the air guidance surface or the air guidance element is sealed against the wheel rim, in particular by means of at least one seal. Particularly high aerodynamic efficiency can thus be obtained.

It is thus provided according to the invention that the air guidance surface extends over less than half, in particular over less than a third, of the internal diameter of the wheel rim also described as a wheel rim internal diameter in the vertical direction of the vehicle, in particular upwards starting from the flank. Air can thus be particularly advantageously guided by means of the air guidance surface during the journey of the motor car, such that the air resistance of the motor car can be reduced in comparison with conventional motor cars. The motor car can consequently be driven in a particularly energy-efficient manner, such that the motor car can be driven in a manner that uses little fuel, for example, or the motor can be electrically driven, in particular purely electrically, over a particularly high range. It has been shown that air can flow along an inner flank of the tire during a journey of the motor car without the use of the air guidance element, such that the air flowing along the inner flank consequently hits the wheel rim, whereby high air-resistance can occur. Such an undesirable flow of air can now be avoided. In other words, the air guidance surface can stop the air flowing along the inner flank from excessively flowing into the wheel or into the wheel rim. The air guidance element also simply described as a guidance element and in particular its air guidance surface also described as a guidance surface can also prevent an excessive intrusion of snow and/or contamination in the wheel rim. An excessive corrosion of components, e.g., axle components of the motor car, can thus be avoided, as these components can be protected from excessive contamination and being sprayed with snow and/or other objects by means of the air guidance element.

In an advantageous embodiment of the invention, the air guidance element has at least one access opening piercing through the air guidance surface able to be flowed through by air. On the one hand, particularly advantageous aerodynamics of the motor car can thus be obtained. On the other hand, sufficient brake ventilation can thus be obtained. The air flowing through the access opening can for example be fed to a brake assigned to the wheel, whereby the brake can be advantageously ventilated.

In order to be able to ventilate the brake as required on the one hand, and on the other to be able to obtain advantageous aerodynamics of the motor car as required, it is provided in a further embodiment of the invention that the access opening is assigned to at least one closing element. The closing element can be moved relative to the air guidance element between at least one closed position and at least one open position. In the closed position, at least one partial region of the access opening is covered by the closing element, and thus closed. It can in particular be provided that the closing element covers and thus closes at least a substantial part, i.e., more than half, of the access opening in the closed position. It is preferably provided that the closing element covers and thus closes the entire access opening in the closed position. Air thus cannot flow through the partial region or through the access opening in the closed position. In the open position, however, the closing element releases at least the partial region, in particular more than half of the access opening and most preferably the entire access opening, such that air can flow through the access opening, in particular to ventilate the brake. It has proved particularly advantageous if the closing element is fixed to the air guidance element moveably between the open position and the closed position. A more compact structure, and thus a structure more favorable to flow of the air guidance device, can thus be guaranteed.

In order to be able to release and close at least the partial region of the access opening as required, it is provided in a further embodiment of the invention that the air guidance device comprises an electric and/or hydraulic and/or pneumatic actuator, by means of which the closing element can be moved relative to the air guidance element between the closed position and the open position.

A further embodiment is characterized in that the air guidance device comprises at least one spring element, by means of which the closing element can be moved from the open position into the closed position and/or from the closed position into the open position. The spring element is preferably a mechanical spring. By using the spring element, a particularly simple and thus aerodynamically advantageous and weight-saving and cost-effective structure can be guaranteed.

In order to move the closing element particularly easily, and thus to be able to obtain an aerodynamically advantageous structure of the air guidance device, it is provided in further embodiments of the invention that the air guidance device comprises at least one bimetal and/or at least one shape memory alloy for moving the closing element This should in particular be understood to mean that the closing element can be moved from the closed position into the open position and/or from the open position into the closed position by means of the bimetal or by means of the shape memory alloy.

In a further, particularly advantageous embodiment of the invention, the wheel can be rotated around the axis of wheel rotation relative to the air guidance element. The air guidance element and the air guidance surface thus remain independent of the rotation of the wheel in the lower region, such that particularly advantageous air guidance can be featured.

In a further, particularly advantageous embodiment of the invention, the air guidance element is fixed to a check rail, via which the wheel is flexibly fixed to the structure of the motor car. The check rail permits deflection movements of the wheel inwards and outwards in the vertical direction of the vehicle, for example. As the air guidance element is preferably fixed to the check rail at least indirectly, the air guidance element can move with the wheel in the vertical direction of the vehicle. It can thus be ensured that the air guidance element always has an advantageous alignment or positioning relative to the wheel, and thus in particular relative to the wheel rim.

In particular, it is conceivable that the air guidance element is fixed to a wheel carrier and can thus be moved with the wheel carrier and the wheel, wherein however the wheel can be rotated relative to the wheel carrier and relative to the air guidance element. The wheel is rotatably fixed to the wheel carrier via a wheel bearing, for example. As the air guidance element is at least indirectly fixed to the check rail, for example via the wheel carrier, in particular independently of the wheel, the air guidance element is mounted so as to be fixed in relation to the axle. The air guidance element thus remains on the check rail when a wheel is changed, within which a wheel is changed and switched for another wheel. An advantageous level of accessibility, in particular to the brake, can additionally be thus guaranteed, which is particularly advantageous during repair and servicing. Particularly when the air guidance element is at least indirectly, in particular directly fixed to the wheel carrier, the air guidance element can be guided with the wheel carrier, and thus with the wheel when the wheel is designed as a guided wheel, such that an advantageous and aerodynamically favorable alignment of the air guidance element and the air guidance compartments relative to the wheel can be guaranteed.

Further information on which the invention is based is that, in particular in the case of vehicles having a high ground clearance, i.e., having a high spacing from the ground, e.g., SUVs, air can flow along an undercarriage of the respective vehicle and reach the inner flank also described as a wheel flank and impact the wheel rim, in particular its inner ring. This impact can cause an excessive air resistance. Sports vehicles having a comparatively relatively low ground clearance can have fixedly mounted guide blades that can direct fresh air to the brakes to cool the brakes. This principle permanently generates air-resistance, however, wherein, particularly when the brakes have a lower temperature, a cooling of the brakes is undesired. By means of the air guidance device according to the invention, an advantageous and targeted guidance of air can be obtained. It is conceivable that the air guidance region or the air guidance element is dome-shaped in at least one section, such that an uneven or domed further air guidance surface borders the air guidance surface extending in the specified plane, in particular directly.

A further embodiment is characterized in that the air guidance element has at least one or several vortex generator (s) protruding from the air guidance surface in the transverse direction of the vehicle, in particular inwards, by means of which at least one vortex of the air flowing over the air guidance element can be generated by means of the vortex generator, such that particularly advantageous aerodynamics can be featured.

The previously specified actuator for moving the closing element is a servomotor, for example, by means of which brake cooling can be featured as required. The specified bimetal or the specified shape memory alloy enable a temperature-dependent movement of the closing element. This should in particular be understood to mean that the shape memory alloy or the bimetal deforms when a temperature of the shape memory alloy or the bimetal changes, whereby the closing element is moved relative to the air guidance element. The access opening can thus be released or closed as required in a particularly simple and thus aerodynamically favorable manner.

A second aspect of the invention relates to a motor car preferably designed as a passenger car having at least one air guidance device according to the first aspect of the invention. Advantages and advantageous embodiments of the first aspect of the invention should be seen as advantages and advantageous embodiments of the second aspect of the invention and vice versa.

Further advantages and details of the invention result from the following description and with reference to the figures.

DETAILED DESCRIPTION OF THE DRAWINGS

Figure 1:
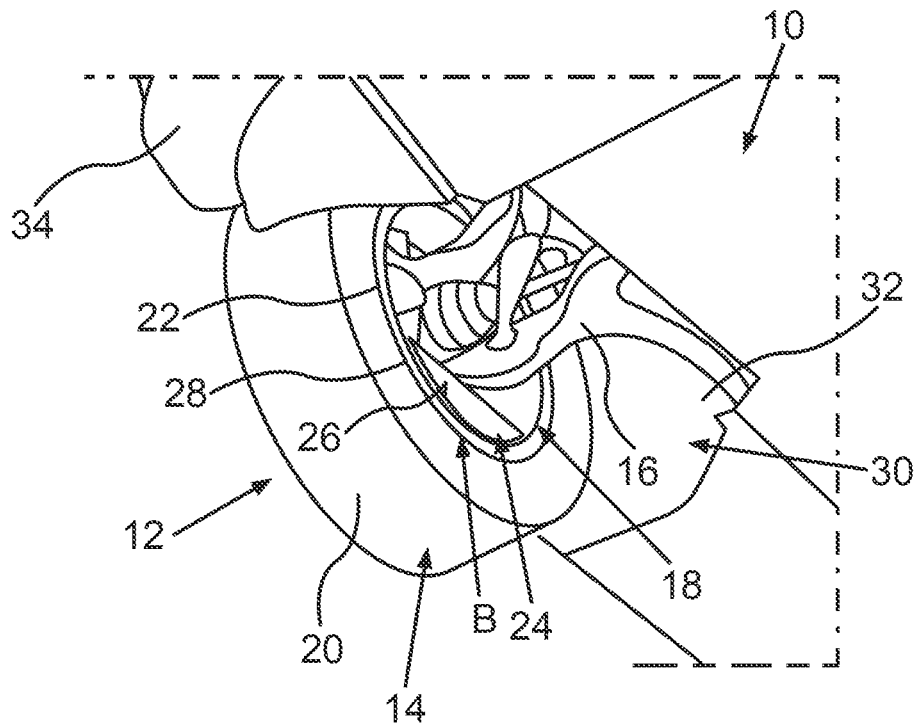
FIG. 1 shows a schematic and perspective view from below of an air guidance device for a motor vehicle according to a first embodiment, having an air guidance element that has an air guidance surface that extends in a plane running perpendicular to an axis of wheel rotation of a wheel.

Identical elements or elements having identical functions are provided with the same reference numerals in the figures.

FIG. 1 shows a portion of a front end of a motor car designed as a passenger car in a schematic and perspective view from below with an oblique viewing angle from below in a direction of the inside of a wheel 14. A first embodiment of an air guidance device of the motor car can be seen. This means that the motor car comprises the air guidance device in the completely manufactured state. The motor car additionally comprises a structure designed as a self-supporting body that delimits or forms an interior of the motor car. People, e.g., the driver of the motor car, can be located in the interior during the respective journey of the motor car. The structure comprises a base also described as an undercarriage, by which the interior is at least partially, in particular at least substantially or entirely, delimited downwards in the vertical direction of the vehicle. A part of an undercarriage cladding 10 of the motor car can been seen in FIG. 1, by the undercarriage cladding 10 of which the base is covered and thus cladded downwards in the vertical direction of the vehicle (z direction in the vehicle coordinate system).

The motor car additionally comprises an axle 12 that has at least or exactly two wheels spaced apart from each other in the transverse direction of the vehicle (y-direction in the vehicle coordinate system) and also described as ground contact elements or vehicle wheels. Of the wheels of the axis 12, the wheel provided with the reference numeral 14 can be seen in FIG. 1. The wheel 14 is rotatably mounted on a wheel carrier that cannot be seen in more detail in FIG. 1, and can thus be rotated around an axis of rotation relative to the wheel carrier and relative to the structure. The wheel 14 is additionally flexibly fixed to the structure via at least one check rail 16, in particular such that it can be pivoted. This should in particular be understood to mean that the check rail 16 permits deflection movements of the wheel 14 inwards and outwards relative to the structure in the vertical direction of the vehicle. These deflection movements of the wheel 14 inwards and outwards occur, for example, when the wheel 14 rolls over an uneven patch of ground during a journey of the motor car.

The wheel 14 can be a driven or drivable wheel that can be driven by means of a drive motor of the motor car designed as an electric engine or as an internal combustion engine, for example. The wheel 14 can further be a non-driven or non-drivable wheel. It is further conceivable that the wheel 14 is a non-guidable wheel that cannot be guided relative to the structure in order to cause the motor car to change direction or change lanes. It is further conceivable that the wheel 14 is a guidable wheel that can be guided, in particular together with the wheel carrier, to cause the motor car to change lanes and to drive in a curve and to change direction relative to the structure and relative to the check rail 16.

The wheel 14 has a wheel rim 18 and a tire 20 that is raised on the wheel rim 18. The wheel rim 18 has an internal diameter in particular running perpendicular to the axis of wheel rotation, which is in particular formed or delimited by a wheel rim ring 22 of the wheel rim 18, also simply described as a ring. The air guidance device comprises at least one air guidance element 24 assigned to the wheel 14, which has an air guidance surface 26 for guiding air flowing over the air guidance surface 26 during a journey of the motor car. As can be seen from FIG. 1, the air guidance element 24 is arranged on the inside of the wheel 14 or the wheel rim 18, and thus on the side of the wheel rim facing the other front wheel arranged on the opposite side of the motor car.

To be able to obtain particularly advantageous aerodynamics of the motor car, and thus to be able to drive the motor car in a particularly energy-efficient manner, the air guidance surface 26, in particular at least a substantial part of the air guidance surface 26 or preferably the entire air guidance surface 26, extends in a plane running perpendicular to the axis of wheel rotation, which coincides with an x-z plane stretched through the longitudinal direction of the vehicle (x direction) and the vertical direction of the vehicle (z direction), the axis of wheel rotation lying in this x-z plane, in particular when the axis of wheel rotation runs in the transverse direction of the vehicle or in parallel to the transverse direction of the vehicle (y direction). The air guidance surface 26 further directly borders a flank 28 of the wheel rim 18 or the wheel rim ring 22 inwards in the transverse direction of the vehicle and/or upwards in the vertical direction of the vehicle in a lower region B in the vertical direction of the vehicle, wherein the air guidance surface 26 additionally extends over less than half of the internal diameter, in particular over at most a third of the internal diameter in the vertical direction of the vehicle, in particular upwards from the lower region B. It is in particular provided that the entire air guidance surface 26 is arranged under the check rail 16 in the vertical direction of the vehicle. By means of the air guidance surface 26, it can be avoided that an excessive quantity of air flows into the wheel rim 18, specifically from the inside of the wheel 14. An excessive intrusion of dirt, snow and/or other objects into the wheel rim 18 can additionally be avoided, such that an excessive corrosion of the components of the axis 12 can be avoided. It is important that the air guidance element 14 delimits a—preferably very narrow—gap with the wheel rim ring 22, the gap being at least large enough to avoid the air guidance element 14 that is fixed in its position, i.e., unmoving or still in relation to the wheel rim rubbing on the wheel rim when the wheel 14 rotates. The air guidance surface 26—as seen in the transverse direction of the vehicle (y direction)—is preferably arranged at the height of the wheel rim flange, and preferably does not protrude out of the wheel rim in the direction of the centre of the vehicle. The air guidance element thus shields the space surrounded by the wheel rim 18 or the wheel rim ring from air flowing over or past the inner flank of the wheel flowing into the wheel or the wheel rim. Furthermore, an intrusion of snow and other contamination into the space surrounded by the wheel rim is also preferably prevented, but at least significantly reduced. It remains to be noted that while the wheel rotates, the air guidance element no longer rotates, but is instead held on at least one motor vehicle component such that the wheel can rotate freely, i.e., relative to the air guidance element.

The air guidance element 24 described in the following is substantially designed as a flat disc, wherein its outer contour, at least in the depicted exemplary embodiment, has the shape of a circle segment. A circle segment also described as a circle portion should be understood as the partial surface of a circle surface that is delimited by a circle arc and a chord. The radius of the circle segment substantially corresponds to or is slightly smaller than the internal diameter of the wheel rim in the portion surrounding the air guidance element 24. It remains to be noted that the air guidance element 24 is arranged underneath the axis of wheel rotation and at least substantially shields the interior from the entry of air, water and particles.

The wheel 14 is at least partially, in particular at least substantially, arranged in a wheel housing 30 that is at least partially, in particular at least substantially, delimited by a wheel arch shell 32 of the motor car, also described as a wheel housing cladding. In the first embodiment shown in FIG. 1, the axle 12 is a front axle of the motor car, such that the wheel 14 is a front wheel. A front bumper 34 of the motor car can additionally partially be seen in FIG. 1.

It can further be seen that the air guidance element 24 or the air guidance surface 26 is a shield on the inner flank 28, also described as a wheel flank, in the lower region B of the front wheel. An excessive intrusion of dirt and air into the wheel rim 18 can thus be avoided.

Figure 2:
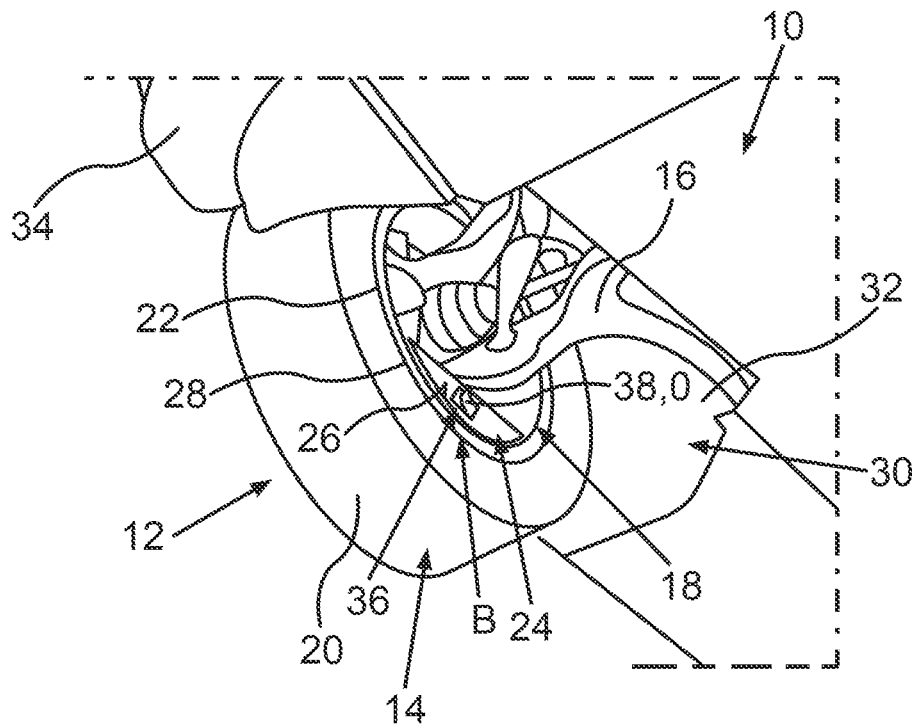
FIG. 2 shows a schematic and perspective view from below of the air guidance device according to the second embodiment.

In the first embodiment, the entire air guidance surface 26 is free of the access openings piercing through the air guidance surface 26. By contrast, FIG. 2 shows a second embodiment of the air guidance device. In the second embodiment, the air guidance element 24 has at least or exactly one access opening 36 piercing through the air guidance surface 26. A closing element 38 is assigned to the access opening 36, which is at least indirectly, in particular directly, fixed to the air guidance element 24 moveably relative to the air guidance element 24 between at least one open position O shown in FIG. 2 and a closed position. The closing element 38 can thus be moved with the air guidance element 24. It is additionally provided that the wheel 14 can be rotated around the axis of wheel rotation relative to the air guidance element 24. In the closed position, the closing element 38 closes the entire access opening 36, such that no air can flow through access opening 36 in the closed position. In the closed position, the closing element 38 closes the entire access opening 36, such that no air can flow through the access opening 36 in the closed position. In the open position O, however, the closing element 38 releases the access opening 36, such that air can then flow through the access opening 36.

A brake that cannot be seen in the figures and in particular designed as a friction brake is assigned to the wheel 14, for example, by means of which the wheel 14, and thus the motor car as a whole, can be braked. The brake is in particular a component of an operating brake of the motor car. In the open position O, air can flow through the released access opening 36, wherein the air flowing through the access opening 36 can for example be fed to the specified brake. Brake ventilation can thus be implemented, within the scope of which the brake can be cooled by means of the air flowing through the access opening 36. As the access opening 36 can be closed and released as required by means of the closing element 38, the brake can be cooled as required. For this purpose, the air guidance device can comprise at least one actuator, for example designed as a servomotor, that can be operated hydraulically and/or pneumatically and/or electrically. By operating the actuator, the closing element 38 can be moved relative to the air guidance element 24 from the open position O into the closed position and/or from the closed position into the open position. Alternatively or in addition, at least one or several passive elements, e.g., at least one spring and/or at least one bimetal and/or at least one shape memory alloy, can be assigned to the closing element 38 to thus move the closing element 38 relative to the air guidance element 24 from the closed position into the open position O and/or from the open position O into the closed position.

If, for example, a temperate of the brake is lower than a threshold value that is or can be pre-determined, then the closing element 38 is located in the closed position, as a cooling of the brake is not required. Advantageous aerodynamics can thus be obtained. If the temperature of the brake corresponds to the threshold value or if the temperature of the brake exceeds the threshold value, then the closing element 38 is moved from the closed position into the open position O, such that air can flow through the access opening 36 as cooling air, flow to the brake and cool the brake. If the temperature of the brake also described as a brake temperature falls below the threshold value due to this cooling, then the closing element 38 is moved from the open position O into the closed position in order to close the access opening 36 again.

Figure 3:
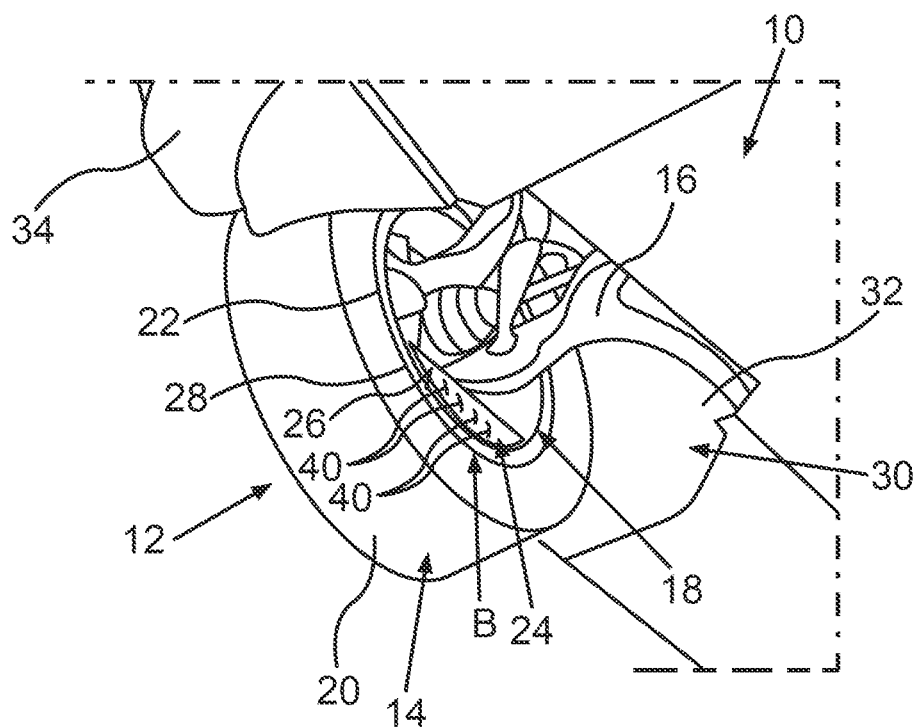
FIG. 3 shows a schematic and perspective view from below of the air guidance device according to a third embodiment.

It can be advantageous to provide further air guidance elements, in particular depending on the vehicle, design etc. FIG. 3 shows a third embodiment of the air guidance device. In the third embodiment, the air guidance element has several vortex generators 40 spaced apart from one another, which protrude inwards from the air guidance surface 26 in the transverse direction of the vehicle. The respective vortex generator 40 is designed to create a vortex from the air that flows over the air guidance element 24 in a targeted manner, and thus to generate at least one or several vortexes of the air flowing over the air guidance element 24. The air resistance can thus be kept particularly low. In the third embodiment, the vortex generators 40 are arranged one after the other in the longitudinal direction of the vehicle, such that the vortex generators 40 respectively overlap at least partially in pairs in the longitudinal direction of the vehicle.

The invention claimed is:

1. An air guidance device of a motor car, wherein the motor car has a wheel (14) rotatable around an axis of wheel rotation and wherein the wheel (14) has a wheel rim (18) with an internal diameter, comprising:
   an air guidance element (24) assigned to the wheel (14) that has an air guidance surface (26), wherein air flowing over the air guidance surface (26) during a journey of the motor car is guidable by the air guidance surface (26);
   wherein the air guidance surface (26) extends in a plane running perpendicularly to the axis of wheel rotation, directly borders an inner flank (28) of the wheel rim (18) inwards in a transverse direction of the motor car and upwards in a vertical direction of the motor car in a lower region (B) in the vertical direction of the motor car, and extends over less than half of the internal diameter in the vertical direction of the motor car;
   wherein an entirety of the air guidance element (24) is disposed underneath the axis of wheel rotation.

2. The air guidance device according to claim 1, wherein the air guidance element (24) has at least one access opening (36) piercing through the air guidance surface (26).

3. The air guidance device according to claim 2, wherein a closing element (38) is assigned to the access opening (36), wherein the closing element is movable relative to the air guidance element (24) between a closed position closing at least a partial region of the access opening (36) and an open position (O) that releases the partial region.

4. The air guidance device according to claim 3, wherein the closing element (38) is movably fixed to the air guidance element (24).

5. The air guidance device according to claim 3, further comprising an actuator, wherein the closing element (38) is movable relative to the air guidance element (24) by the actuator.

6. The air guidance device according to claim 5, wherein the actuator is operable electrically and/or hydraulically and/or pneumatically.

7. The air guidance device according to claim 3, further comprising at least one spring element for moving the closing element (38).

8. The air guidance device according to claim 3, further comprising at least one bimetal and/or at least one shape memory alloy for moving the closing element (38).

9. The air guidance device according to claim 1, wherein the wheel (14) is rotatable relative to the air guidance element (24).

10. The air guidance device according to claim 1, wherein the air guidance element (24) is fixed to a check rail (16) and wherein the wheel (14) is flexibly fixed to a structure of the motor car via the check rail (16).

11. The air guidance device according to claim 1, wherein the air guidance element (24) has at least one vortex generator (40) protruding from the air guidance surface (26) in the transverse direction of the motor car and wherein at least one vortex of air flowing over the air guidance element (24) is generatable in a targeted manner via the at least one vortex generator (40).

12. A motor car, comprising:
   the air guidance device according to claim 1.

* * * * *